United States Patent [19]

Moore et al.

[11] Patent Number: 5,294,662
[45] Date of Patent: Mar. 15, 1994

[54] AQUEOUS FLUOROCHEMICAL COMPOSITIONS AND COATINGS THEREFROM

[75] Inventors: George G. I. Moore, Afton; Dong-Wei Zhu, Woodbury, both of Minn.

[73] Assignee: Minnesota Mining and Manufacturing Company, St. Paul, Minn.

[21] Appl. No.: 47,782

[22] Filed: Apr. 15, 1993

[51] Int. Cl.$^5$ ............................................. C08L 39/00
[52] U.S. Cl. .................................. 524/516; 524/520; 526/254
[58] Field of Search ............... 524/516, 520; 526/243, 526/248, 250

[56] References Cited

U.S. PATENT DOCUMENTS

| | | |
|---|---|---|
| 2,642,416 | 6/1953 | Ahlbrecht et al. . |
| 2,732,370 | 1/1956 | Codding . |
| 2,803,615 | 8/1957 | Ahlbrecht et al. . |
| 2,826,564 | 3/1958 | Bovey et al. . |
| 3,078,245 | 2/1963 | Heine . |
| 3,277,039 | 10/1966 | Marascia et al. . |
| 3,699,156 | 10/1972 | Holland et al. . |
| 4,554,325 | 11/1985 | Schmidt et al. . |
| 4,592,930 | 6/1986 | Schmidt et al. . |
| 4,606,973 | 8/1986 | Schmidt et al. . |
| 4,764,564 | 8/1988 | Schmidt et al. . |
| 4,929,666 | 5/1990 | Schmidt et al. . |
| 5,006,624 | 4/1991 | Schmidt et al. . |

OTHER PUBLICATIONS

Chem Abstract 84(20):13658g.

Primary Examiner—Joseph L. Schofer
Assistant Examiner—N. Sarofim
Attorney, Agent, or Firm—Gary L. Griswold; Waltern N. Kirn; Robert H. Brink

[57] ABSTRACT

Novel polymers are disclosed which can be used to prepare water-based compositions are disclosed having the capability of forming a uniform, low surface-energy, thin film on a substrate. Such compositions comprise a polymer having at least one fluoroaliphatic moiety and at least one anionic moiety, and a novel polymer having at least one fluoroaliphatic moiety and at least one oxazoline moiety.

8 Claims, No Drawings

AQUEOUS FLUOROCHEMICAL COMPOSITIONS AND COATINGS THEREFROM

This invention relates to water-soluble or water-dispersible, crosslinkable, fluorine-containing polymer, aqueous composition comprising said polymer, and methods of making said polymer and composition. In another aspect, this invention relates to coatings and coated articles obtained from said aqueous composition, and methods of making said coating and coated articles.

Fluorochemicals are widely used to impart low surface energy to substrates. Several patents to Schmidt et al., which are described below, disclose certain water-based compositions said to give useful fluorine-containing coatings with low surface energy.

U.S. Pat. Nos. 4,554,325 and 4,592,930 (Schmidt et al.) disclose polymers comprising pendant rearranged oxazoline or oxazine portions linked to a perfluorocarbon moiety. Such polymers are said to provide coating compositions which exhibit critical surface tensions of wetting of less than about 15 dynes/cm.

U.S. Pat. Nos. 4,606,973 and 4,764,564 (Schmidt et al.) disclose polymers comprising pendant amino-functional portions linked to a perfluorocarbon moiety having a perfluoroalkyl group, and coating compositions comprising said polymers. Such polymers are said to provide coating compositions which exhibit critical surface tensions of wetting of less than about 15 dynes/cm.

U.S. Pat. Nos. 4,929,666 and 5,006,624 (Schmidt et al.) describe certain polymeric surfactants having at least one pendant fluorocarbon moiety and at least one pendant ionic moiety. Water-based crosslinkable coating compositions comprising an aqueous solution of said polymer and a polymeric crosslinking agent having an ionic or potentially ionic moiety are also disclosed. Such compositions are said to be capable of forming a uniform, thin film, on a surface to be coated, and the capability, on crosslinking, to form a uniform, thin coating having a critical surface tension less than about 19 dynes/cm.

Briefly, in one aspect, the present invention provides water-soluble or water-dispersible polymer having at least one oxazoline or oxazine moiety and at least one fluoroaliphatic moiety. Such polymers can be illustrated by the following formula:

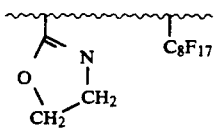

In another aspect, this invention provides a water-based composition comprising an aqueous solution, emulsion, or dispersion of (a) a water-soluble or water-dispersible polymer having at least one fluoroaliphatic moiety and at least one anionic moiety, such as carboxylate, which is capable of reacting with an oxazoline or oxazine moiety and (b) a water-soluble or water-dispersible polymer having at least one oxazoline or oxazine moiety and at least one fluoroaliphatic moiety. Said composition has the capability of forming a uniform, low surface-energy, thin film or coating, on a surface coated with said composition. Preferably, the weight % of fluorine, based on total weight of the polymers, is at least 30%.

In another aspect, this invention provides coated articles comprising a surface having a coating or film derived from the water-based composition of this invention. Methods of making said coated articles are also disclosed.

As used herein, "anionic" means capable of forming anions in aqueous mixtures. As used herein, "polymer" or "polymers" includes polymers and oligomers.

The coated articles of this invention are resistant to wetting because of the low surface-energy film or coating. Possible applications include soilreleasing automotive protective finishes and glazes, anti-soiling carpet and fabric treatments, protective coatings for building walls and other construction surfaces, mold release coatings, fly fishing line coatings, wound dressings, and the like.

The anionic moiety-containing polymers useful in this invention preferably have an average of more than two reactive ionic moieties per polymer. Preferably, the anionic moiety-containing polymers have an average of more than one fluoroaliphatic moiety per polymer. Such polymers include those described, for example, in U.S. Pat. No 4,929,666, supra, which descriptions are hereby incorporated by reference.

Useful anionic moieties include carboxy, mercaptan, or sulfonamide moieties which can be reacted with bases to obtain carboxylate, mercaptide, and sulfonamide salts. At lower pH values, these moieties become essentially nonionic. The particularly preferred anionic moiety is carboxylate. The carboxylate anionic polymer can be utilized in the water-based compositions of this invention as its ammonium salt.

The anionic moiety-containing polymers useful in the present invention, can be prepared, for example, by the addition polymerization of fluoroaliphatic radical-containing ethylenically unsaturated monomer, such as acrylate, e.g. $CH_2=CHCOOCH_2CH_2N(Et)SO_2C_8F_{17}$, Vinyl ether, or styrenic monomers, and ethylenically unsaturated carboxylic acid monomer, such as acrylate, e.g. 2-carboxyethyl acrylate, vinyl ether, or styrenic monomers.

The polymers of this invention, having at least one oxazoline or oxazine moiety and at least one fluoroaliphatic moiety, can be prepared by the addition polymerization of fluoroaliphatic radical-containing ethylenically unsaturated monomer, such as acrylate, e.g. $CH_2=CHCOOCH_2CH_2N(Et)SO_2C_8F_{17}$, vinyl ether, or styrenic monomers, and oxazine or oxazoline-containing ethylenically unsaturated monomer, such as 2-isopropenyl-2-oxazoline (IPO), and those represented by the general structures:

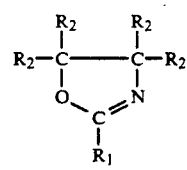

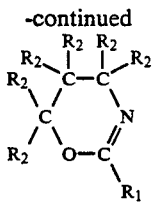

wherein $R_1$ is an organic radical having addition polymerizable unsaturation, such as $\alpha$-$\beta$ ethylenic unsaturation. Preferably, $R_1$ is an isopropenyl group. Each $R_2$ is independently hydrogen, halogen, or an substituted organic radical, preferably $R_2$ is hydrogen.

The oxazoline or oxazine containing polymers of the present invention preferably have an average of more than two oxazoline or oxazine moieties per polymer. Preferably, the oxazoline or oxazine containing polymers have an average of more than one fluoroaliphatic moiety per polymer.

The fluoroaliphatic moiety can be a fluorinated, stable, inert, preferably saturated, non-polar, monovalent aliphatic or cycloaliphatic moiety. It can be straight chain, branched chain, cyclic, or combinations thereof. It can contain catenary heteroatoms, bonded only to carbon atoms, such as oxygen, divalent or hexavalent sulfur, or nitrogen. A fully-fluorinated moiety is preferred but hydrogen or chlorine atoms can be present as substituents provided that not more than one atom of either is present for every two carbon atoms. The moiety has at least 3 carbon atoms, preferably 3 to 20 carbon atoms and most preferably about 4 to about 10 carbon atoms. The terminal portion of the moiety is a perfluorinated moiety which will preferably contain at least 7 fluorine atoms, e.g., $CF_3CF_2CF_2-$, $(CF_3)_2CF-$, $F_5SCF_2-$, or the like.

The compositions of the present invention are useful for preparing coated articles such as plastic, glass, metal, or ceramic articles.

EXAMPLES

In the following Examples and Comparative Examples, oxazoline-containing polymers and carboxyl-containing polymers were prepared. Aqueous compositions containing oxazoline-containing polymer and carboxyl-containing polymer were then prepared. The resulting compositions appear to have good stability, with some samples still capable of forming coatings with low surface energy after 6 months aging at room temperature. The aqueous compositions were coated onto substrates and dried, the resulting coatings (or films) were evaluated.

The following acrylates and vinyl ethers were used as monomers:

| MONOMERS | |
|---|---|
| Acrylate A | $CH_2=CHCOOCH_2CH_2N(Et)SO_2C_8F_{17}$ |
| Acrylate B | $CH_2=CHCOOCH_2CH_2N(Me)SO_2C_8F_{17}$ |
| Acrylate C | $CH_2=CHCOOCH_2C_7F_{15}$ |
| Acrylate D | $CH_2=C(CH_3)COOCH_2C_7F_{15}$ |
| Acrylate E | $CH_2=C(CH_3)COOCH_2CH_2OC_9F_{17}$ |
| Acrylate F | $CH_2=C(CH_3)COOCH_2CH_2(CF_2)_nCF_3$ |
| | Where n is 5, 7, and 9, average of 7.0 |
| Acrylate G | $CH_2=C(CH_3)COOCH_2C_6F_{11}$ |
| | where $C_6F_{11}$ represents a mixture of perfluorocyclohexane and trifluoromethyl-perfluorocyclopentane. |
| Acrylate H | $CH_2=CHCOOCH_2C_2F_4OC_8F_{17}$ |
| Vinyl Ether I | $CH_2=CHO(CH_2)_4OC_9F_{17}$ |

| MONOMERS | |
|---|---|
| Vinyl Ether J | $CH_2=CHOCH_2CH_2N(Et)SO_2C_8F_{17}$ |

Acrylates A and B were prepared as described in U.S. Pat. No. 2,803,615 (Ahlbrecht et al.). Acrylates C and D were prepared as described in U.S. Pat. No. 2,642,416 (Ahlbrecht et al.). Acrylate E was prepared as described in Chem. Abstracts 84(20):136258g. Acrylate F was prepared as described in U.S. Pat. No. 3,277,039 (Marascia et al.). Acrylate G was prepared as described in U.S. Pat. No. 3,699,156 (Holland et al.). Acrylate H was prepared as described in U.S. Pat. No. 2,826,564 (Bovey et al.). Vinyl ether I was prepared as described in U.S. Pat. No. 2,732,370 (Codding et al.). Vinyl ether J was prepared as described in U.S. Pat. No. 3,078,245 (Heine et al.).

EXAMPLE 1

In Example 1, an oxazoline-containing polymer of this invention was prepared. A mixture of acrylate A (40.0 g, 67 mmol), 2-isopropenyl-2-oxazoline ("IPO") (10.0 g, 90 mmol), azobis(isobutyronitrile) ("AIBN") (0.301 g), and methyl ethyl ketone (MEK) (14 g) was added to a refluxing mixture of 50.0 g each of 2-propanol and MEK in a 3-necked flask, under nitrogen, over 2.5 hours. The resulting solution was stirred at reflux for 18 hours. An additional 0.302 g of AIBN was added and heating was continued for 10 hours. The resulting copolymer ("A/IPO copolymer") was precipitated out by adding this solution to 600 ml of heptane. The A/IPO copolymer was then further purified by dissolving in acetone and re-precipitation from heptane. 24.5 g of lightly colored solid A/IPO copolymer was obtained after drying in vacuum. Strong absorption band at $1660 cm^{-1}$ confirms the presence of 2-oxazoline moiety. Strong absorption band at around $1220 cm^{-1}$ confirms the presence of fluorine. Elemental analysis showed the following weight percents: 37.9 % carbon, 3.6 % hydrogen, 5.2 % nitrogen, 35.7 % fluorine. The weight ratio of interpolymerized units in the A/IPO copolymer was calculated, based on nitrogen analysis, to be 72% derived from acrylate A and 28% derived from IPO. The weight ratio of interpolymerized units in the A/IPO copolymer was calculated, based on quantitative 13C NMR, to be 76% derived from acrylate A and 24% derived from IPO.

A solution of 5 g of the above A/IPO copolymer of this invention in 10 g ethyl acetate and 10 g acetone was dispersed into 40 ml water containing 0.15 g of $C_7F_{15}CO_2NH_4$ in a blender under fast stirring. The organic solvents were then evaporated under reduced pressure at around 80° C. to form a stable dispersion. This dispersion had no flash point, indicating there was little residual organic solvent. The dispersion appeared homogeneous. It is surprising that this highly fluorinated copolymer is water-dispersible despite the lack of an ionic comonomer.

Next, a carboxyl-containing polymer was prepared. A mixture of acrylate A (240 g, 0.40 mole), 2-carboxyethyl acrylate ("CEA") (160 g, 1.11 mole), AIBN (1.0 g), MEK (100 g), and 2-propanol (100 g) was added to a refluxing mixture of 100 g each MEK and 2-propanol, under nitrogen, over 6 hr. The heating and stirring were continued for 12 hr to produce a solution of copolymer ("A/CEA copolymer"). This organic polymer solution was dispersed into an aqueous system by adding, with stirring, a 50 g portion to 180 g of water containing about 8 g of 30% ammonia. The organic solvents were then stripped off under reduced pressure at 80 to 85° C. No flash point was observed for this sample.

A 5.0 gram sample of the above A/IPO copolymer dispersion (13.8% solids) was mixed with a 4.9 g sample of the above A/CEA copolymer dispersion (19.0% solids) and then diluted to 10% solids by addition of water. The molar ratio of the carboxy functionality in the A/CEA copolymer to the oxazoline functionality in the A/IPO copolymer was calculated to be 1.6. In other words, there are 1.6 carboxy groups per oxazoline group. This mixture was allowed to sit at room temperature for at least two weeks after which it was coated onto a glass slide with a #12 Mayer rod to a coating thickness of about 2.7 microns. The resulting coating was then heated in a oven at 120° C. for 30 min.

The resulting film was clear and resistant to solvents. The weight % fluorine, based on total solids, of the polymers was calculated from the known fluorine content of the monomers. The resulting film was tested for water contact angle and film critical surface energy by the methods described in Zisman, W.A., "Contact Angle, Wettability, and Adhesion," Advances in Chemistry Series 43, American Chemical Society, Washington, D.C. (1964). The resulting films were also evaluated using a "pen test" consisting of drawing a line on the coated glass slide using a blue Sharpie TM fine point permanent marker available from the Sanford company. A number value of 0 to 3 was assigned based on the appearance of the resulting line. The values are defined as follows: 3: totally unwettable, ink dewets to form a discontinuous line (best); 2: ink partially dewets to form a very thin continuous line; 1: some dewetting; 0: totally wettable, same as nontreated surface (worst). For illustration of the test method, a line written on a Teflon TM surface dewets slightly and is assigned a 1. The results are shown in Table 1.

EXAMPLES 2-23

In Examples 2-23, additional IPO copolymers and additional CEA copolymers were prepared and dispersed in water as described in Example 1, utilizing the various monomers listed above. The suspensions were mixed, maintained at room temperature for at least two weeks, coated, heated, and tested as in Example 1. The compositions and results are summarized in Table 1.

The monomers used, and the weight ratio of the monomer feed used in each copolymer, are shown in Table 1. For example, "D/CEA (80:20)" means that a CEA copolymer was prepared as in Example 1 with a monomer feed ratio of 80 weight % acrylate D and 20 weight % CEA. The molar ratio of carboxylate functionality to oxazoline functionality was calculated based on weight of monomer, and was 1.6 for each Example.

EXAMPLE 24

A copolymer was prepared by copolymerization of maleic anhydride ("MA") and vinyl ether J. Maleic anhydride (4.9 g, 50 mmol), vinyl ether J (27.3 g, 50 mmol), AIBN (0.3 g), and carbon tetrabromide (0.019 g) were dissolved in ethyl acetate (30 g) and charged into a flask. The mixture was purged with nitrogen and polymerized at 80° C. for 3 to 4 hours. The resulting polymer was not very soluble in ethyl acetate and the polymer layer separated from solvent upon cooling to room temperature. The solvent was decanted and the polymer was dispersed into 150 g of water containing 7 g of 30% $NH_3$. The remaining solvent was stripped off under reduced pressure at 80° C.

A coating composition wa prepared by mixing the above copolymer dispersion (4.84 g, 12.3% solids) with the A/IPO copolymer dispersion of Example 1 (4.84 g, 12.3% solids). The molar ratio of carboxylate functionality to oxazoline functionality was calculated based on weight % of monomer to be 2.0. The mixture was adjusted to about 10% solids using water. The resulting mixture was maintained at room temperature for at least two weeks, coated, heated, and tested as in Example 1. The results of the test are shown in Table 1.

EXAMPLE 25

As in Example 24, a copolymer of vinyl ether J and MA was prepared using the weight ratio of monomers shown in table 1. This copolymer, after being dispersed into an aqueous system using triethylamine, was mixed with the IPO copolymer dispersion of Example 1. The resulting mixture was maintained at room temperature for at least two weeks, coated, heated, and tested as in Example 1. The resulting coating was clear and solvent resistant. The results are shown in Table 1. The molar ratio of carboxylate functionality to oxazoline functionality was calculated based on weight % of monomer to be 2.0.

TABLE 1

| EX | FORMULATION | % F | CONTACT ANGLE WATER | CRITICAL SURFACE TENSION dynes/cm | PEN TEST |
|---|---|---|---|---|---|
| 1 | A/IPO (80:20) A/CEA (60:40) | 36.1 | 116 | 11.0 | 3 |
| 2 | A/IPO (80:20) A/CEA (70:30) | 38.4 | 114 | 11.3 | 3 |
| 3 | A/IPO (80:20) A/CEA (80:20) | 41.4 | 113 | 13.2 | 3 |
| 4 | A/IPO (75:25) A/CEA (60:40) | 34.4 | 112 | 11.6 | 3 |
| 5 | A/IPO (75:25) A/CEA (75:25) | 38.8 | 114 | 11.0 | 3 |
| 6 | A/IPO (75:25) A/CEA (75:25) 1% suspension | 38.8 | 112 | 12.8 | 3 |
| 7 | A/IPO (70:30) A/CEA (60:40) | 32.8 | 102 | 10.9 | 3 |
| 8 | A/IPO (60:40) A/CEA (20:80) | 39.4 | 116 | 10.9 | 3 |
| 9 | A/IPO (60:40) A/CEA (60:40) | 31.0 | 108 | 11.6 | 3 |
| 10 | A/IPO (80:20) F/CEA (60:40) | 37.9 | 112 | 13.3 | 2 |
| 11 | A/IPO (80:20) F/CEA (60:40) | 38.9 | 113 | 10.4 | 3 |
| 12 | A/IPO (80:20) B/CEA (60:40) | 36.1 | 116 | 9.8 | 3 |
| 13 | A/IPO (80:20) D/CEA (60:40) | 38.9 | 113 | 11.0 | 3 |
| 14 | A/IPO (80:20) C/CEA (60:40) | 39.5 | 112 | 11.1 | 3 |
| 15 | C/IPO (70:30) C/CEA (60:40) | 37.5 | 98 | 8.6 | 1 |
| 16 | C/IPO (70:30) A/CEA (60:40) | 35.0 | 112 | 11.4 | 2 |
| 17 | H/IPO (70:30) A/CEA (60:40) | 33.6 | 111 | 14.0 | 3 |
| 18 | A/IPO (80:20) G/CEA (60:40) | 37.1 | 112 | 14.8 | 2 |
| 19 | F/IPO (70:30) A/CEA (60:40) | 35.5 | 120 | 12.0 | 3 |
| 20 | F/IPO (70:30) F/CEA (60:40) | 38.8 | 116 | 11.1 | 3 |
| 21 | B/IPO (70:30) A/CEA (60:40) | 33.4 | 114 | 10.0 | 3 |
| 22 | A/IPO (70:30) | 33.5 | 114 | 12.0 | 3 |

TABLE 1-continued

| EX | FORMULATION | % F | CONTACT ANGLE WATER | CRITICAL SURFACE TENSION dynes/cm | PEN TEST |
|---|---|---|---|---|---|
| 23 | B/CEA (60:40) B/IPO (70:30) B/CEA (60:40) | 34.0 | 115 | 10.9 | 3 |
| 24 | A/IPO (80:20) I/MA (85:15) | 46.8 | 115 | 15.4 | 1 |
| 25 | A/IPO (80:20) J/MA (86:14) | 44.1 | 116 | 11.4 | 2 |

The data in Table 1 show that the compositions of this invention can form coatings having low surface energy and which are also generally less wettable under the pen test than comparable known compositions. For comparison, Teflon ™ gives a rating of 1 under the pen test.

EXAMPLES 26–29

A series of coating compositions was prepared by mixing varying amounts of the two copolymer suspensions of Example 1. The resulting compositions were then maintained at room temperature for at least two weeks, coated, heated, and tested as in Example 1. The compositions and films were tested as above. The molar ratio of carboxylate functionality to oxazoline functionality was calculated based on weight % of monomer and is shown in Table 2 as "$CO_2H:IPO$ ratio". The results are shown in Table 2.

TABLE 2

| Example | $CO_2H:IPO$ ratio | Contact Angle Water | Critical Surface Tension dynes/cm | Pen Test | % F |
|---|---|---|---|---|---|
| 26 | 0.4 | 115 | 11.7 | 2 | 39.0 |
| 27 | 0.8 | 114 | 14.4 | 3 | 37.9 |
| 28 | 2.4 | 115 | 12.0 | 3 | 35.0 |
| 29 | 3.2 | 111 | 10.6 | 2 | 34.4 |

The data in Table 2 show that the ratio of the two polymers may be varied without adversely affecting the performance of the coating.

COMPARATIVE EXAMPLES C1 to C5

Comparative Examples C1 to C5 were prepared according to the teaching of U.S. Pat. No. '666, supra. An aqueous, 10% solids solution of IPO homopolymer of oxazoline functionality of 9.0 mmol per gram of dry polymer (10.0 g, total reactive functionality of 9.0 mmol) was mixed with an aqueous solution of A/CEA copolymer as in Example 1, functionality: 2.31 mmol per gram of dry polymer by titration, 23.2% solids, (16.8 g, total reactive functional of 9.0 mmol) and diluted with 22.2 g of water to a 10% solution. The above composition was diluted with water to specific concentrations shown in Table 3. The coatings were prepared according to Example 1, except the coating were prepared from freshly prepared mixtures that did not stand at room temperature for two weeks. The static contact angles of water and hexadecane, and the pen test results were obtained as in Example 1. The results are shown in Table 3.

EXAMPLES 30 to 34

An aqueous solution of the A/IPO copolymer of Example 1 (functionality of 2.52 mmol per gram of dry polymer by elemental analysis, 10% solids, 20.0 g, total reactive functional of 5.04 mmol) was mixed with the A/CEA copolymer solution of Comparative Example C1(9.4 g, total reactive functional: 5.04 mmol) and diluted with 12.4 g of water to a 10% solids solution.

The above composition was diluted with water to specific % solids shown in Table 3. The coatings were prepared according to Example 1, except the coating were prepared from freshly prepared mixtures that did not stand at room temperature for two weeks. Their static contact angles of water and hexadecane ($C_{16}H_{34}$), and the pen test results were obtained as in Example 1. The results are shown in Table 3.

TABLE 3

| Example | % Solids | Contact Angle Water/$C_{16}H_{34}$ | Pen Test | % F |
|---|---|---|---|---|
| C1 | 10.0 | 91/66 | 1 | 24.7 |
| C2 | 5.0 | 78/66 | 1 | 24.7 |
| C3 | 2.0 | 77/66 | 0 | 24.7 |
| C4 | 1.0 | 85/64 | 0 | 24.7 |
| C5 | 0.5 | 87/63 | 0 | 24.7 |
| 30 | 10.0 | 112/65 | 3 | 34.7 |
| 31 | 5.0 | 112/65 | 3 | 34.7 |
| 32 | 2.0 | 112/65 | 2 | 34.7 |
| 33 | 1.0 | 111/64 | 0 | 34.7 |
| 34 | 0.5 | 109/65 | 0 | 34.7 |

The data in Table 3 show that coatings made from the compositions of this invention have lower surface energies compared to analogous known compositions as shown by the higher contact angles and improved resistance to wetting in the pen test. The improvements seen by the compositions of the present invention are particularly apparent at low concentrations.

The 2% composition of Comparative Example C3 and the 2% composition of Example 32 were tested for oil and water repellency on fabrics. Each composition (the compositions were used as freshly prepared and did not stand at room temperature for two weeks) was sprayed on a test fabric made of 6 different materials as shown in Table 4, to a weight pickup equal to the weight of the fabric. The sprayed fabric was then heated at 120° C. for 60 min. Scotchgard ™ Textile Finishes SPS-3010 Oil Test Kit and Scotchgard ™ Textile Finishes SPS-3011 Aqueous Test Kit were used to measure oil and water repellency (Scale of 0–10, higher number indicates more repellency). The results are shown in Table 4.

TABLE 4

| Fabric | Example 32 Repellency (Oil/Water) | Comp Example C3 Repellency (Oil/Water) |
|---|---|---|
| Spun Diacetate | 2/5 | 3/2 |
| Bleached Cotton | 1/3 | 1/2 |
| Spun Polyamide (Nylon 6:6) | 2/4 | 1/1 |
| Spun Polyester (Dacron 54) | 4/3 | 4/1 |
| Spun Polyacrylic (Orlon 75) | 4/4 | 4/2 |
| Worsted Wool | 2/5 | 0/1 |

The data in Table 4 show that compositions of the present invention can be used to impart improved water repellency to a variety of fabrics, compared to compositions such as those disclosed in Schmidt et. al U.S. Pat. '666, supra. Oil repellency can be obtained with the compositions of present invention equal to or better than compositions such as those shown in the '666 patent for all fabrics except spun diacetate.

The 10% composition of Comparative Example C1 and the 10% composition of Example 30 were coated onto glass slides and cured at 120° C. for 30 minutes (the compositions were used as freshly prepared and did not stand at room temperature for two weeks). These glass slides were then tested according to ASTM D3330-78 PSTC-1 for peel adhesion to tackified styrene-isoprene block copolymer adhesive coated on an ethylenepropylene impact copolymer backing ("Tape 1"), and 3M #232 masking tape ("Tape 2"). The results are reported in Table 5 for both initial and aged results. The "aged" values were obtained from samples aged at 65° C. for 72 hr. For example, an entry in Table 5 of "2.2/3.2" means the sample had an peel force of 2.2 ounces per inch initially and 3.2 ounces per inch after aging.

TABLE 5

|  | Tape 1 | Tape 2 |
|---|---|---|
| Example 30 Peel Force (Oz.In) Initial/Aged | 2.2/3.2 | 6.1/8.4 |
| Comparative C1 Peel Force (Oz/in) initial/Aged | 2.6/3.7 | 9.8/17.8 |

The data in Table 5 show that coatings derived from the compositions of the present invention have reduced peel force as compared with coating compositions such as those described in '666 patent, and would be more useful as release coating for pressure sensitive adhesives.

In Examples 35–40, a fluorochemical surfactant was added to the coating composition to improve the wettability without degrading the properties of the resulting coatings. The lower the solution surface tension, the better the composition will wet a substrate. In these Examples the fluorochemical surfactant $C_8F_{17}SO_2N(CH_2CH_3)CH_2CO_2NH_4$, commercially available from 3M Company as FC-129 surfactant, was added to the emulsion. The mole % of surfactant based on total moles of carboxy functionality and surfactant are shown in Table 6 at a specified molar ratio, shown in Table 6 as "mole % surfactant". As discussed in U.S. Pat. No. 4,929,666 (Schmidt), this surfactant may become incorporated into the polymer by reaction with the pendant oxazoline group of the IPO copolymer.

EXAMPLE 35

In Example 35, a sample of A/IPO (75:25) copolymer aqueous solution (5.0 g, 10.1% solids) was mixed with a A/CEA (60:40) copolymer aqueous solution and 0.034 g of the fluorochemical surfactant and diluted to 5 % solids by addition of 15.5 g of water. The surface tension of this mixture was 33.3 dyne/cm. The resulting mixture was maintained at room temperature for at least two weeks, coated, heated, and tested as in Example 1. The surface tension of this finished film was 12.4 dyne/cm as shown in Table 6.

EXAMPLES 36–40

Compositions were maintained at room temperature for at least two weeks, coated, heated, and tested as in Example 35 except with varying amounts of the fluorochemical surfactant and CEA copolymer. The solution surface tension and final film surface tensions are reported in Table 6. Note that Example 39 contained no CEA copolymer, and Example 40 contained none of the fluorochemical surfactant.

TABLE 6

| Example | mole % surfactant | Soln. Surface tension (dynes/cm) | Contact Angle (water) | Critical Surface tension dynes/cm | Pen Test |
|---|---|---|---|---|---|
| 35 | 5 | 33.3 | 113 | 12.4 | 3 |
| 36 | 10 | 31.0 | 114 | 10.8 | 3 |
| 37 | 20 | 27.7 | 115 | 10.9 | 3 |
| 38 | 50 | 21.5 | 120 | 10.5 | 1 |
| 39 | 100 | 17.5 | 124 | 7.6 | 0 |
| 40 | 0 | 37.5 | 114 | 11.3 | 3 |

The data in Table 6 show that surfactant may be added to the coating compositions of this invention to reduce the solution surface tension and improve the wetting. Example 39, which did not perform well in the pen test, did not contain any of the A/CEA copolymer. Example 38, with 50 mole % surfactant, did not perform well in the pen test, perhaps because the crosslinking of the coating was affected by the relatively high surfactant concentration.

EXAMPLE 41

A solution of neutralized A/CEA copolymer from Example 1 (20.0 g, 23.2% in water, pH=8) was mixed with 0.86 g of $C_8F_{17}SO_2N(CH_2CH_3)CH_2CO_2K$, commercially available from 3M Company as FC-129 surfactant, and placed into a blender with an additional 20 g of water. To this solution, a sample of A/IPO (75:25) copolymer solution prepared as in Example 1 (11.8 g, 35.7% solids in methyl ethyl ketone) was added slowly under vigorous stirring. Organic solvents were then stripped off.

The compositions of Example 41 and Comparative Example C1 were maintained at room temperature for at least two weeks, coated, and heated as in Example 1. The resulting coatings were tested for UV stabilization ability according to ASTM G26-90. The contact angles were measured initially and after 2,000 hours. The results are shown in Table 7.

TABLE 7

|  | Example 41 | | Comparative Example C1 | |
|---|---|---|---|---|
|  | Initial | Aged | Initial | Aged |
| Hexadecane | 65 | 42 | 60 | 30 |
| Water | 110 | 95 | 109 | 78 |

The results in Table 7 show that the coating of the present invention are more stable to UV than known compositions such as Comparative Example C1.

Various modifications and alterations of this invention will become apparent to those skilled in the art without departing from the scope and spirit of this invention.

What is claimed is:

1. A water-based composition comprising an aqueous solution, emulsion, or dispersion of
   (a) a water-soluble or water-dispersible polymer or oligomer having at least one fluoroaliphatic moiety and at least one anionic moiety which is capable of reacting with an oxazoline or oxazine moiety, and
   (b) a water-soluble or water-dispersible polymer or oligomer having at least one fluoroaliphatic moiety and at least one oxazoline or oxazine moiety.

2. The composition of claim 1 wherein said oxazoline moiety is derived from 2-isopropenyl-2-oxazoline.

3. The composition of claim 1 wherein said anionic moiety is a carboxylic acid or a carboxylate salt.

4. The composition of claim 1 wherein said polymer or oligomer having at least one anionic moiety comprises interpolymerized units derived from fluoroaliphatic radical-containing acrylate and carboxy-containing acrylate.

5. The composition of claim 1 wherein said polymer or oligomer having at least one oxazoline or oxazine moiety comprises interpolymerized units derived from fluoroaliphatic radical-containing acrylate and 2-isopropenyl-2-oxazoline.

6. The composition of claim 1 wherein the weight % of fluorine, based on total weight of the polymers, is at least 30%.

7. A coating derived from drying the composition of claim 1.

8. A coated article comprising the coating of claim 7.